United States Patent [19]

Osterloh

[11] Patent Number: 4,937,859
[45] Date of Patent: Jun. 26, 1990

[54] TELEPHONE HANDSET FOR TABLE AND WALL OPERATION

[75] Inventor: Hans-Dieter Osterloh, Rhede, Fed. Rep. of Germany

[73] Assignee: Siemens Aktiengesellschaft, Berlin and Munich, Fed. Rep. of Germany

[21] Appl. No.: 327,680

[22] Filed: Mar. 23, 1989

[30] Foreign Application Priority Data

Mar. 24, 1988 [DE] Fed. Rep. of Germany ....... 8804027

[51] Int. Cl.$^5$ ............................................. H04M 1/08
[52] U.S. Cl. .................................... 379/435; 379/426
[58] Field of Search ............... 379/424, 426, 428, 433, 379/435, 448, 455

[56] References Cited

U.S. PATENT DOCUMENTS 2,949,509  8/1960  Whidden ............................. 379/435
4,517,420  5/1985  Haskins ............................... 379/426
4,768,225  8/1988  Bloechl et al. ...................... 379/435

FOREIGN PATENT DOCUMENTS 2920286  8/1981  Fed. Rep. of Germany .

Primary Examiner—Jin F. Ng
Assistant Examiner—Jhancy Augustus
Attorney, Agent, or Firm—John F. Moran; Eugene S. Indyk

[57] ABSTRACT

A projection of a retaining element swivel-mounted inside a base part of a telephone set projects through the region of the cradle for the handset of the telephone set. The projection engages in a recess of the handset. The retaining element is directly connected with the switch bar for the cradle switch, swivel-mounted and under spring tension.

4 Claims, 1 Drawing Sheet

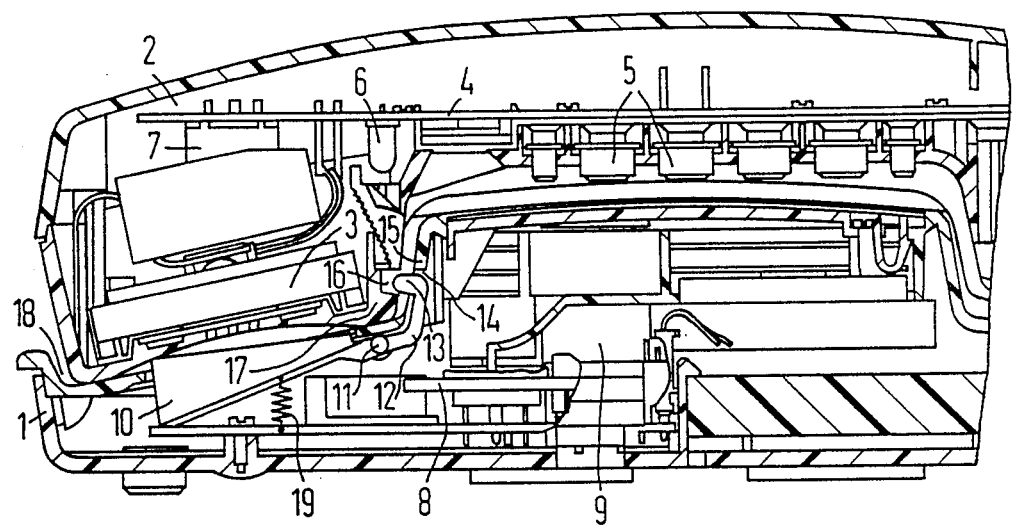

TELEPHONE HANDSET FOR TABLE AND WALL OPERATION

BACKGROUND OF THE INVENTION

1. Technical Field

The invention relates generally to telephone sets, and more particularly to a telephone set for table and wall operation with a base part comprising at least one cradle for a handset, with a retaining element being swivel-mounted within the base part and having a projection which projects through a region of the cradle and which engages into a recess of the handset.

2. Description of the Prior Art

A telephone set of this type is known from, e.g., German Pat. No. 29 20 286, in which an angularly configured retaining element is swivel-mounted in the interior of a base part. One free end of the retaining element is under tension from a pressure spring, while the other free end has a projection that flushly closes an opening in the cradle when the telephone set is used as a table device. In the region of the end of the retaining element that is under spring tension, an opening is provided in a base pan of the telephone set which permits a screw-head to pass through. When the telephone set is wall-mounted, the screw-head that serves to attach the set to the wall presses upon the end of the retaining element that is under spring tension, so that the retaining element is displaced. Consequently, the projection projects beyond the cradle and engages in a keyed manner into a recess in the receiver region of the handset.

Furthermore it is known from U.S. Pat. No. 4,768,225 to utilize an insertable filler body in telephone sets for table and wall operation. This filler body can be inserted and secured in a freely accessible recess in the region of the cradle. If the telephone set is used as a desk set the filler body becomes flush with the cradle, whereas for the use as a wall-mounted set, a projection which is integrally connected to the filler body projects beyond the contours of the cradle. This projection engages into a recess of approximately matching shape in the handset.

The prior art design and installation of the retaining element within the telephone set requires a relatively large amount of space that is not always available in today's telephone sets in which the components are densely mounted.

An object of the invention is to substantially reduce the space required for the retaining element.

SUMMARY OF THE INVENTION

The above-described problems and related problems of prior art station sets are solved by the present invention in that the retaining element is combined with a swivel-mounted spring-loaded switch bar for the cradle switch.

In accordance with the present invention, the retaining element has the advantage that no separate bearing site need be created within the telephone set. The retaining element can be made integral with the switch bar.

The projection, in this arrangement, is preferably designed in a spherical form at its end region, so as to facilitate the handset's removal from or its replacement upon the base part.

BRIEF DESCRIPTION OF THE DRAWING

Additional features of the invention and additional objects of the invention will be more readily appreciated and better understood by reference to the following detailed description which should be considered in conjunction with the drawing, in which the sole FIGURE shows a portion of a telephone set in accordance with the invention in cross-section.

DETAILED DESCRIPTION OF THE DRAWING

The telephone set comprises a base part 1 and a handset 2 that may be rested upon the base part. In this exemplary embodiment, a receiver capsule 3, parts of a pushbutton set 5 arranged on a circuit board 4, and various electrical and electronic components 6 and 7 connected to the circuit board 4 are shown in handset 2.

The base part 1 houses, among other parts, a ringing adjustment 8, a receptacle 9 for a plug of a flexible cord as well as the switch bar 10 for a cradle switch. Switch bar 10 is swivel-mounted at point 11 and coupled to a retaining element 12 which is provided with a projection 13 at its free end. Projection 11 projects through an opening 14 in wall 15 of cradle 18 in base compartment 1 when handset 2 is in its resting position. Projection 11 is designed, e.g., in spherical form at its end region to facilitate the handset's removal and placement upon base part 1. The free end of the projection 13, in turn, engages in a recess 16 in the housing 17 of the receiver region of the handset and thus prevents handset 2 from falling off when the telephone set is used as a wall-mounted set. When the handset 2 is lifted, the switch bar is displaced by the tension of a spring 19 and projection 13 is disengaged from recess 16 in handset 2. As shown in the FIGURE, spring 19 in the exemplary embodiment is a pressure spring. Alternatively, spring 19 can be formed as a leaf spring under switch bar 10 or as a coil spring mounted around point 11.

These and similar changes will be apparent to one of skill in the art and do not depart from the scope of the invention as defined by claims following.

What is claimed is:

1. A telephone set for table and wall operation comprising:
    a handset having a recess therein;
    a base part having at least one cradle for said handset, said base part including a cradle switch;
    means for actuating said cradle switch and retaining said handset, said means being swivel mounted inside said base part and comprising at one end a switch bar for said cradle switch and on the other end a retaining element, said switch bar projecting through said cradle and said retaining element having a projection which projects beyond said cradle and which engages in said recess of said handset in response to the direct actuation of said switch bar by said handset; and
    spring means urging said switch bar beyond said cradle and against said handset.

2. A telephone set according to claim 1, wherein said projection of the retaining element has a spherical shape at its end region.

3. A telephone set according to claim 1, wherein said retaining element is integral with said switch bar.

4. A telephone set according to claim 2, wherein said retaining element is integral with said switch bar.

* * * * *